Feb. 7, 1950  J. E. McCABE  2,497,004
RETRACTABLE SHOCK-ABSORBING LANDING GEAR
Filed Nov. 13, 1947  2 Sheets-Sheet 1
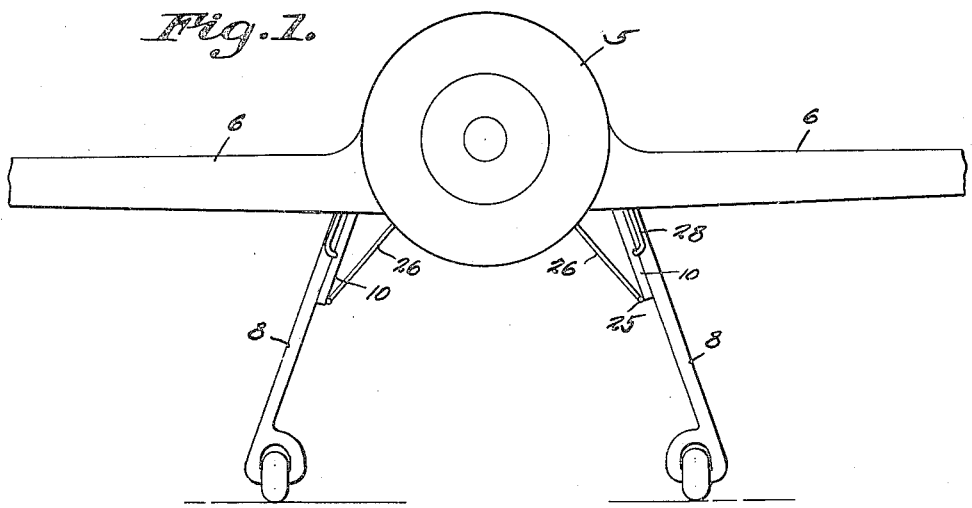
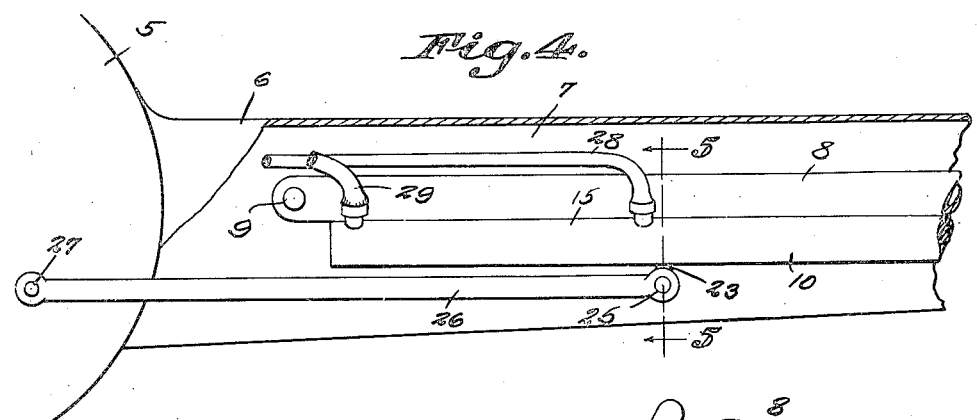
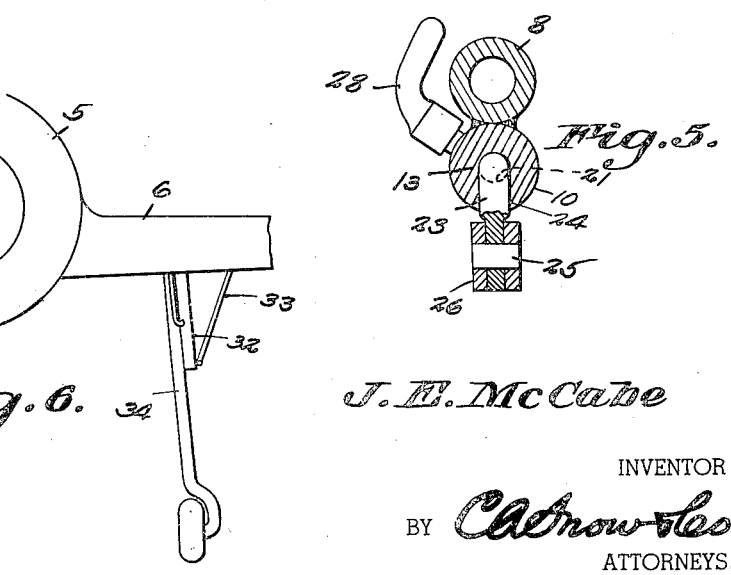
J. E. McCabe
INVENTOR
BY C. A. Snow & Co.
ATTORNEYS.

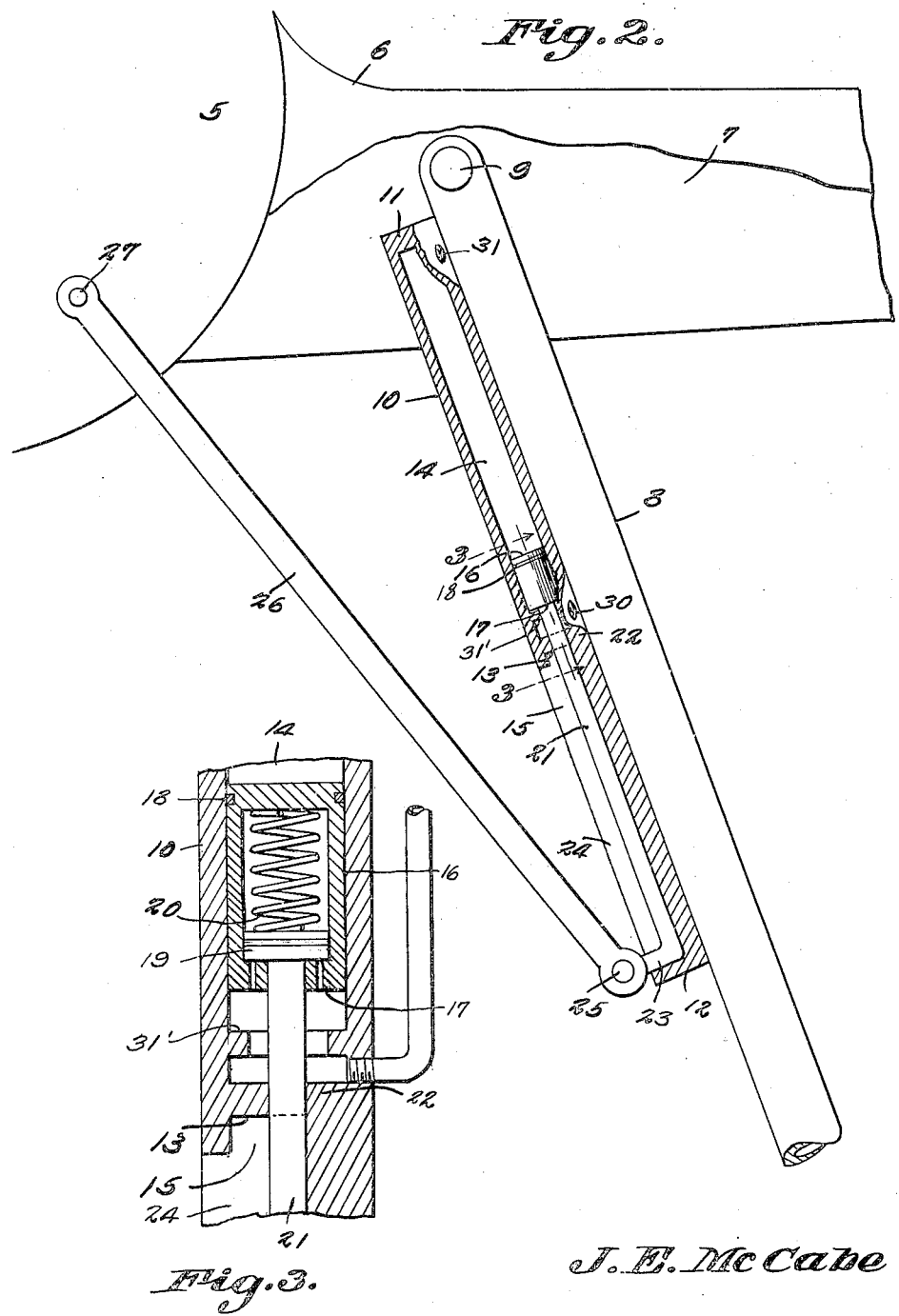

Patented Feb. 7, 1950

2,497,004

UNITED STATES PATENT OFFICE 2,497,004

RETRACTABLE SHOCK-ABSORBING LANDING GEAR

James E. McCabe, Jackson Heights, N. Y.

Application November 13, 1947, Serial No. 785,722

7 Claims. (Cl. 244—102)

This invention relates to retractable landing gear for airplanes, and has reference to a retractable landing gear of the hydraulic type.

An important object of the invention is to provide a hydraulically operated landing gear which is unusually simple and compact, so as to be particularly adapted for installation on light aircraft.

Another important object of the invention is to provide a retractable landing gear which is not only simple and extremely light, but which also will be of a design permitting its ready adaptation to different types of mountings. Stated otherwise, the invention aims to provide a landing gear which can be mounted for movement in a fore and aft direction, that is, in lines parallel to the axis of the fuselage, recessed in the wings for movement in a line perpendicular to said axis, or recessed in the belly of the fuselage, also for movement in a line perpendicular to the axis of the fuselage.

Still another important object of the invention is to provide a simplified retractable landing gear construction that embodies, directly in the hydraulic actuating means thereof, an efficient but wholly simple and automatically operating shock absorber arrangement.

Another important object is to provide a landing gear which is extremely durable, comprises few parts simply arranged, and is capable of speedy and economical manufacture and installation.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a front elevational view of one type of landing gear constructed in accordance with the invention, wherein the wheels recess into the wings, lowered into operative position.

Figure 2 is a fragmentary front elevational view on an enlarged scale, wherein a hydraulic actuating means embodied in the invention is shown in longitudinal section.

Figure 3 is a view taken substantially on line 3—3 of Figure 2.

Figure 4 is a fragmentary front elevational view showing the landing gear retracted.

Figure 5 is a view on line 5—5 of Figure 4.

Figure 6 is a front elevational view of a modification, wherein the wheels recess into the belly of the fuselage.

Referring to the drawings in detail, the reference character 5 designates the fuselage of an airplane, while 6 designates the wings thereof. The wings are each formed with a recess 7 in the under side thereof, the recess, as will be recognized, being of suitable length and depth to permit the landing gear to be fully retracted therein, as best shown in Figure 4.

For the purpose of simplicity of description, the gear for retracting only one wheel will be described hereinafter, it being pointed out that the gear for retracting the other wheel is of identical construction.

In the invention, I employ a wheel-supporting member 8, which may be, and preferably is, of a one-piece, tubular construction, this member being thus seen to be of wholly rigid, integral construction from end to end thereof. I have found that this admirably serves the purpose of providing an unusually strong but simple and economical wheel support.

The wheel is mounted at one end of the wheel-supporting member 8, which may be termed the free end, by any suitable means, and the other end of the member is pivotally connected as at 9, to wing 6, adjacent the meeting point of the wing and fuselage, as best shown in Figures 2 and 4. This connection, as will be seen, permits swinging movement of the wheel-supporting member 8 in a plane perpendicular to the axis of the fuselage.

Extended longitudinally of the wheel-supporting member 8 is a cylinder 10, the upper end 11 and lower end 12 of which are closed. Cylinder 10 is rigidly joined, as by welding or the like, to the wheel-supporting member 8, the cylinder being mounted on what may be termed the under side of the wheel-supporting member 8, considering the member in its retracted position. Cylinder 10 extends from a point adjacent the pivotal connection 9, to a point intermediate the ends of the member 8.

Intermediate the ends of the cylinder 10 is cast a partition 13, and thus, there is defined in the cylinder a fluid chamber 14, and a piston rod housing 15.

Mounted for reciprocation within the fluid chamber 14 is a hollow cylindrical piston 16, having a ported inner end 17. Piston 16 may be grooved intermediate its faces for the reception of an annular gasket 18, designed to prevent leakage of fluid.

Slidable in the hollow piston 16 is a piston 19, and interposed between the upper end of piston 16 and the opposed face of piston 19 is a coiled spring 20. A piston rod 21 is fixedly connected at one end to piston 19, and extends through the ported inner end 17 of the hollow piston and through a central opening in the partition 13, into the piston rod housing 15.

The inner wall of housing 15 is built up solidly from end to end as at 22, and is longitudinally grooved, to prevent the piston rod from being bent out of axial alignment under the strain of landing. The other end of the piston rod 21 is formed, preferably integrally with a lateral arm 23, that rides in slot 24 extended longitudinally of the housing 15, between lower end 12 and partition 13.

By means of a pivotal connection 25, arm 23 is joined to one end of a strut 26, the other end of which is pivotally connected at 27 to the fuselage 5.

Fluid lines 28 and 29 extend into the fluid chamber 14, at the respective ends of the chamber, these lines being engaged in openings 30 and 31, respectively, formed in the cylinder wall.

Referring now to the operation of the landing gear, and assuming that the gear is retracted position, as shown in Figure 4, wheel-supporting member 8 and strut 26 will have been fully recessed within the wing, and are substantially parallel to each other and to the wing surfaces. In this position, the hollow piston 16, carrying piston 19, will be disposed adjacent the upper end of cylinder 10, with fluid having been previously pumped through line 28, and filling the space between piston 16 and partition 13.

To lower the gear, the fluid will be pumped out of this space, simultaneously with the pumping, through line 29, of fluid into the space defined between the upper end 11 and piston 16. Since the pivot points 9 and 27 are fixed, arm 23 is accordingly caused to slide in slot 24, toward the end 12 of the cylinder 10, causing the wheel-supporting member 8 to pivot on its connection 9, while strut 26 pivots at 25 and 27. The pivotal connection 25, as will be seen, is thus a sliding pivot.

The amount of fluid pumped into cylinder 10 in lowering the landing gear is coordinated with the arrival, at the lower end 12 of the cylinder, of arm 23, the end 12 constituting a stop for the arm. At this time, the inner end 17 of the hollow piston is engaged by a stop collar 31'. During the operation, meanwhile, spring 20 retains piston 19 in the position shown in Figure 3.

When landing gear is fully lowered, it is seen that the wheel-supporting member 8 is not in a fully perpendicular position, the wheel-supporting members diverging outwardly, when fully lowered, from the fuselage 5 (Figure 1). As a result, when the plane strikes the ground in landing, the tendency will be for the wheel-supporting members 8 to swing toward their respective recesses. The fluid in the chamber 14 will, of course, prevent any substantial movement in this direction, and it is readily seen that when the impact occurs, the tendency will be for piston rod 21 to move away from its engagement with lower end 12 of the cylinder. This causes piston 19 to move toward the upper end of piston 16, compressing the air trapped in the space between the pistons, with a resultant shock absorbent effect. Fluid may enter or leave the hollow piston when the piston 19 is moved therein, through the ported inner end 17.

When it is desired to again retract the landing gear, the operation is reversed, that is, fluid is pumped out of the upper end of the cylinder and into the lower end, until the gear has been fully retracted, as in Figure 4.

In Figure 6, there has been illustrated a modification of the invention, wherein the wheels are retractable into the belly of the fuselage, in a plane perpendicular to the axis thereof. In the modification, the hydraulic actuating means is designated at 32, and is of the same construction as previously described. A wheel strut is designated at 33, while the wheel-supporting member bears the reference character 34. The operation is unchanged, and in effect, the modification consists of mounting the hydraulic means 32 and wheel strut 33 on the opposite side of the wheel-supporting member, so that the wheel-supporting member will recess into the belly of the fuselage.

It is believed sufficiently obvious as not to require additional illustration that the landing gear can with equal ease be mounted for fore and aft movement. Further, while the invention has been shown as applied to the main landing wheels, it will be recognized that it could be applied equally well to a tail wheel or nose wheel.

What is claimed is:

1. Retractable landing gear, including a wheel-supporting member pivotally connected at one end to a supporting body, a hydraulic actuating means carried by said member, said means including a cylinder rigid with the member, spaced pistons in the cylinder, defining between them a space for trapped air, and a piston rod affixed to one of the pistons, and a strut pivotally connected at one end to the supporting body, the other end being pivotally connected to the piston rod.

2. Retractable landing gear, including a rigid wheel-supporting member pivotally connected at one end to a supporting body, a hydraulic actuating means carried by said member, said means including a cylinder rigid with and extended longitudinally of the member, spaced pistons in the cylinder, defining between them a space for trapped air, said pistons being adapted for relative movement toward and away from each other, and a piston rod affixed to one of the pistons, and a rigid strut pivotally connected at one end to the supporting body, the other end being pivoted to the piston rod.

3. Retractable landing gear comprising a wheel-supporting member and a strut each pivoted upon a supporting body, gear retracting means including a cylinder secured to said member and a hydraulically reciprocated piston sliding in the cylinder, and an element having a pivotal connection with the strut and a sliding shock absorbent connection with the piston.

4. Retractable landing gear comprising a wheel-supporting member and a strut each pivoted at one end upon a supporting body, gear retracting means including a cylinder secured to a medial portion of said member and a piston hydraulically reciprocated in the cylinder, and a rod having at one end a cushioned sliding connection with the piston, and having at the other end a pivotal connection with the other end of the strut.

5. Retractable landing gear comprising a wheel-supporting member and a strut each pivoted at its upper end upon a supporting body, gear retracting means including a cylinder secured to a medial portion of said member and a piston hydraulically reciprocated in the cylinder, and a rod having at its upper end a cushioned sliding connection with the piston and having at its lower end a pivotal connection with the lower end of the strut.

6. Retractable landing gear comprising a wheel-supporting member and a strut respectively pivoted at their upper ends to a supporting body, gear retracting means including a cylinder fixed to an intermediate portion of said member and a hollow piston hydraulically reciprocated in the cylinder, a second piston sliding in the hollow piston, said pistons defining between them a trap for a compressible medium, and an element fixed to the second piston and having a pivotal connection with the lower end of the strut.

7. Retractable landing gear comprising a wheel-supporting member and a strut respectively pivoted at their upper ends upon a supporting body, gear retracting means including a cylinder fixedly attached to an intermediate portion of the wheel-supporting member and a hollow piston hydraulically reciprocated in the cylinder, the interior of said piston defining a trap for a compressible medium, a rod sliding in the cylinder and having one end sliding within the pistons for compression of said medium, and a pivotal connection between the other end of the rod and the lower end of the strut.

JAMES E. McCABE.

REFERENCES CITED

The following references are of record in the file of this patent:

UNITED STATES PATENTS

| Number | Name | Date |
|---|---|---|
| 2,132,682 | Dowty | Oct. 11, 1938 |